US009053236B1

(12) United States Patent
Covarrubias et al.

(10) Patent No.: US 9,053,236 B1
(45) Date of Patent: Jun. 9, 2015

(54) AUTOMATED DIRECTORY SERVICES TEST SETUP UTILITY (71) Applicant: EMC Corporation, Hopkinton, MA (US)

(72) Inventors: Victor Covarrubias, Mountain View, CA (US); Veenu Gupta, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 8 days.

(21) Appl. No.: 14/139,760

(22) Filed: Dec. 23, 2013

(51) Int. Cl.
G06F 9/44 (2006.01)
G06F 11/36 (2006.01)

(52) U.S. Cl.
CPC .................................. G06F 11/3684 (2013.01)

(58) Field of Classification Search
USPC .......................................................... 717/124
See application file for complete search history.

(56) References Cited

U.S. PATENT DOCUMENTS 7,805,721 B2 * 9/2010 Feinleib et al. ............... 717/174
8,108,349 B1 * 1/2012 Cherukumudi et al. ...... 707/641
2001/0039549 A1 * 11/2001 Eng et al. ...................... 707/205
2008/0270515 A1 * 10/2008 Chen et al. .................... 709/202
2012/0134300 A1 * 5/2012 Buck et al. .................... 370/259

* cited by examiner

Primary Examiner — Philip Wang
(74) Attorney, Agent, or Firm — Blakely, Sokoloff, Taylor & Zafman LLP (57) ABSTRACT A computer-implemented method, apparatus, and system for creating directory services is described for testing a software application that accesses directory services and comprises receiving a configuration file specifying identification parameters and configuration parameters for configuring directory services, automatically generating a plurality of directory service processing instructions based upon the plurality of identification and configuration parameters in the configuration file, executing the plurality of directory service processing instructions to perform operations to set up directory services without requiring a user to manually provide parameters to set up the directory services, and executing a software application access a storage system using the directory services, including evaluating operations performed by the software application. The operations performed include detecting an operating system environment, invoking a plurality of directory service components, installing and setting up a directory service instance, configuring the directory service instance, and validating that the directory service instance.

18 Claims, 8 Drawing Sheets

Select User Option

DISPLAY: Menu
1.)     Upgrade Directory Server
2.)     Replicate Directory Server
3.)     Migrate Directory Server
4.)     Exit READ choiceNumber IF choiceNumber = 1
   DO Upgrade =============== > Call: upgrade_directory_server ( )
ELSE
     IF choiceNumber = 2
       DO Replication ======== > Call: replicate_directory_server ( )
ELSE
     IF choiceNumber = 3
   DO Migration ===============> Call: migrate_directory_server ( )
     ELSE
         EXIT
ENDIF
ENDIF Function: upgrade_directory_server ( )
Pass In: location of new software version
Identify AD/LDAP configuration
Fetch new component version for upgrade in user-defined location
Perform backup of previous directory server i.e. AD/LDAP metadata, database and configuration data
Begin upgrade of directory server
Start all directory server services
Validate success of software upgrade
IF upgrade = successful
    Return to main menu
ELSE
     IF upgrade != successful
        Restore directory server to previous state
        Return to main menu
Pass Out: Nothing
ENDFunction Function: replicate_directory_server ( )
Pass In: Nothing
Perform backup of directory server i.e. AD/LDAP
Replicate directory resource data to secondary site.
Pass Out: Nothing
Return to main menu
ENDFunction Function: migrate_directory_server ( )
Pass In: Nothing
Perform backup of directory server i.e. AD/LDAP
Find all directory services server files and data
Install/setup directory services
Return to main menu
Pass Out: Nothing
ENDFunction

AUTOMATED DIRECTORY SERVICES TEST SETUP UTILITY

FIELD OF THE INVENTION

Embodiments of the present invention relate generally to directory services. More particularly, embodiments of the invention relate to complete and automatic provisioning of directory services.

BACKGROUND

The current process to set up a lightweight directory access protocol (LDAP) directory services instance, such as Active Directory™ developed by Microsoft® Corporation of Redmond, Wash., requires manual user interaction at each step of the creation, maintenance, and upgrade procedures of the directory services. Furthermore, there is no utility available that consistently provides a standardized Active Directory™/LDAP directory services server for testing, virtualization, replication, migration, and other purposes. Additionally, no procedure is available that can be used to automate test conditions for fully automating particular test cases requiring Active Directory™/LDAP directory services servers in the test configuration, where the directory services are made to be operational and ready for testing. Thus, there is a need for an efficient, flexible, versatile utility to automate the consistent creation, maintenance, and upgrading of a standardized Active Directory™/LDAP directory services server for testing, virtualization, conversion, and migration into a cloud configuration.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Automated directory services setup is described herein. As described above, there is no efficient, flexible, versatile utility to automate the consistent creation, maintenance and upgrading of a standardized Active Directory™ (AD)/Lightweight Directory Access Protocol (LDAP) directory services server for testing, virtualization, conversion, and migration into a cloud configuration. Thus, according to some embodiments, an automated utility is enabled which can consistently create, maintain, and upgrade an AD/LDAP directory services server to save time and minimize the introduction of user errors for testing, virtualization, conversion, and cloud deployment, or other user purposes. In some embodiments, the utility is a tool that creates, maintains, upgrades, and virtualizes new AD/LDAP servers which then can be used to "templatize" a fully customized and operational directory server configuration once the server software stack has been fine tuned.

This reduces the need for manual intervention, knowledge of directory services server internals and provides a clear workflow from initial creation to migration of a virtualized directory services server into a cloud configuration and automation of this process. This also provides a standardized procedure for a utility for the initial creation and conversion of a physical AD/LDAP directory services instance into a virtual instance to prepare it for migration into the cloud.

In another embodiment, the automated procedure provides a workflow for the creation of a utility that can efficiently perform a set of standardized steps to consistently create an Active Directory™/LDAP server for general use, virtualization or migration into a cloud configuration without the need for in depth knowledge of directory services technology.

In yet another embodiment, the automated utility procedure is used to create an Active Directory™/LDAP server while executing automated test cases requiring an Active Directory™/LDAP server in a particular test configuration that can be modularized for automation multi-purposes.

In yet another embodiment, an automated procedure is used to create, maintain, upgrade, replicate, migrate, and convert an Active Directory™/LDAP directory services server from a physical implementation to virtual implementation that can be deployed into a cloud configuration.

Figure 1:
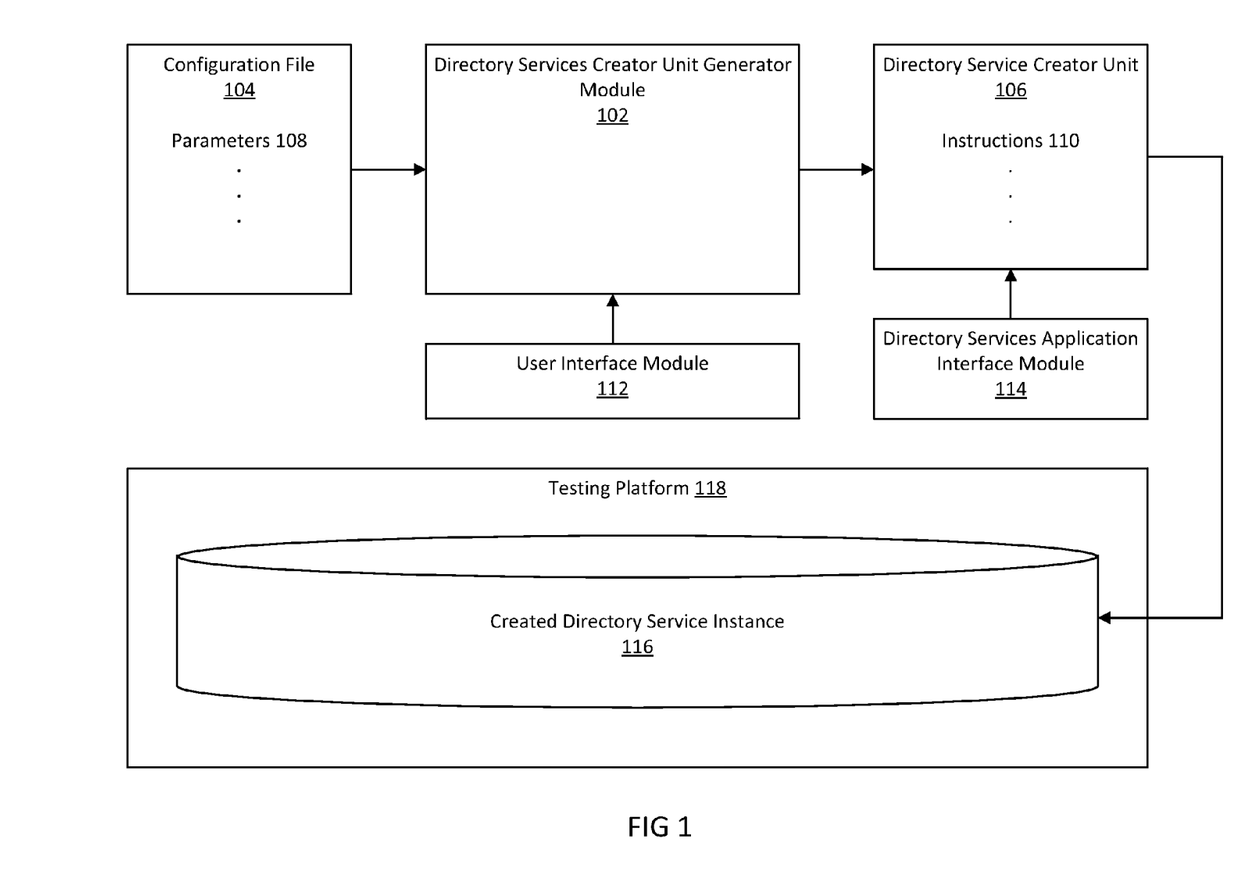
FIG. 1 is a block diagram illustrating automated directory services creation according to one embodiment of the invention.

FIG. 1 is a block diagram illustrating automated directory services creation according to one embodiment of the invention. The directory services creator unit generator module 102 ("generator module") is provided a configuration file 104 with parameters 108. This file may be provided by the user. In some embodiments, the generator module 102 also accepts additional parameters in the form of user input from a user interface module 112. Based on the parameters provided in the configuration file 104 and which may be provided in the user interface module 112, the generator module 102 generates a directory services creator unit 106 ("creator unit"). This creator unit contains instructions 110 which are executed by the testing platform 118. The instructions 110 utilize application libraries provided in the directory services application interface module 114 in order to provide a procedure that, in some embodiments, creates, maintains, upgrades, or virtualizes new LDAP servers, such as the created directory service instance 116 on testing platform 118. Testing platform 118 may be any combination of hardware and/or software and may operate independently or on the same platform as the directory services instance 116.

The creator unit 106 can be used as a template to create fully customized and operational directory service instances. This reduces the need for manual intervention and knowledge of the internal workings of the directory services instance. This allows a user to create and manipulate a directory services/LDAP instance without the need to know low level details. For example, the user does not need to know the low level application interfaces for the database service instance or the underlying operating system. The user only needs to provide the parameters and the automated process performs the remaining operations.

In some embodiments, the generator module 102 directly creates the directory services instance 116 on testing platform 118 without requiring the creation of a separate creator unit 106.

In some embodiments, the newly created directory service instance 116 is migrated, upgraded, replicated, and/or virtualized from another existing directory services instance. In another embodiment the creator unit 106 contains instructions which execute automated test cases on the directory services instance 116. These test cases (not shown) can be modularized so that the user can specify which test cases to run on the created directory services 116 on testing platform 118.

Figure 2:
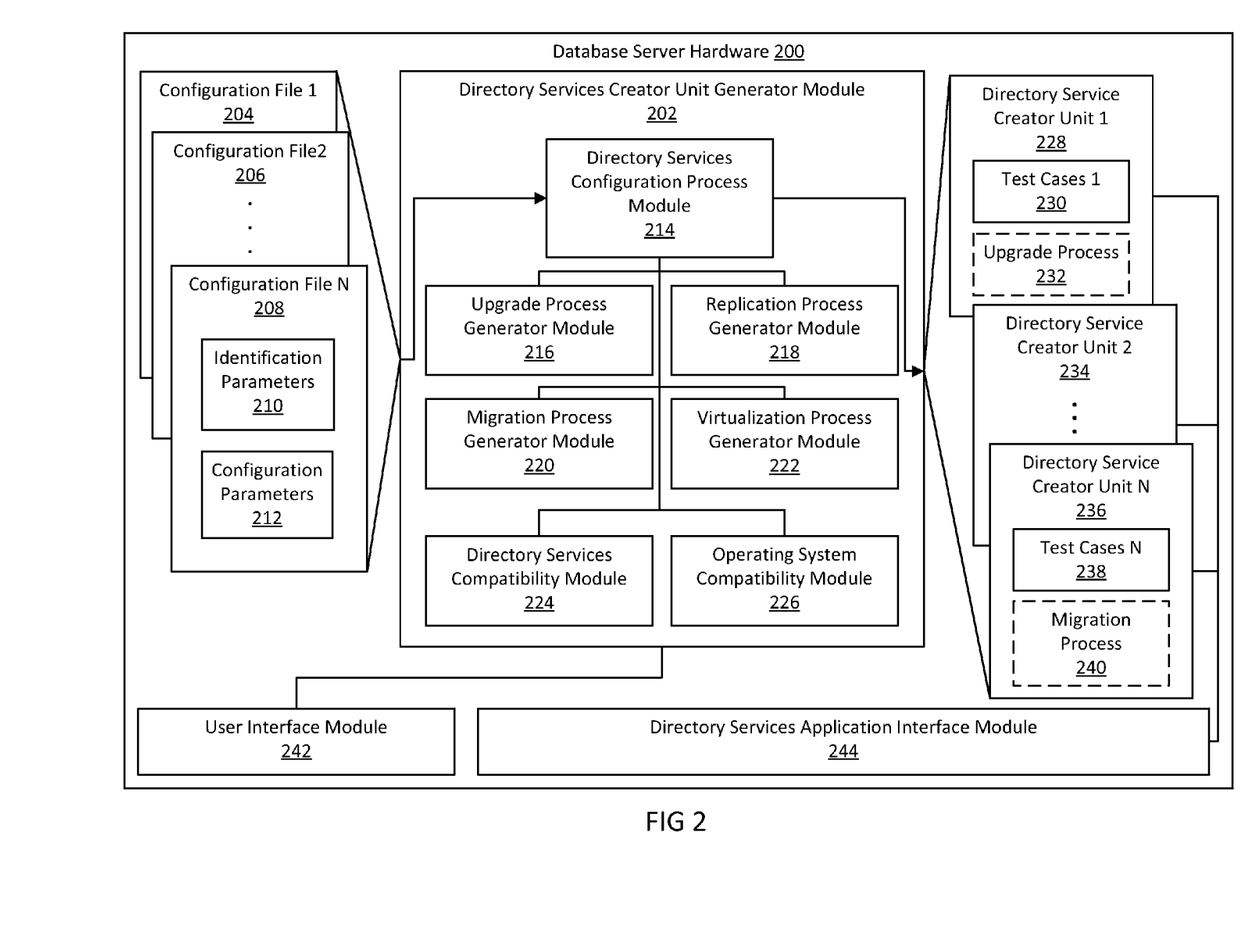
FIG. 2 is a detailed block diagram illustrating automated directory services creation according to one embodiment of the invention.

FIG. 2 is a detailed block diagram illustrating automated directory services creation according to one embodiment of the invention. The server hardware 200, on which the system runs, comprises a variety of possible devices and components and is described in further detail in FIG. 8.

The directory services creator unit generator module 202 accepts different configuration files 204-208 with different identification parameters 210 and configuration parameters 212. The identification parameters 210 (e.g. database file location) identify an existing or to be created directory services instance. The configuration parameters 212 may instruct the module 202 to generate instructions for the directory services creator unit (228-236) which modify the existing or to be created directory services instance based on the options specified by the user. These options may include replicating, migrating, upgrading, and/or virtualizing the directory services instance.

Once the user inputs a configuration file, e.g. configuration file 1 204, to the generator module 202, the generator module 202 processes the file within the directory services configuration processing module 214, which may be implemented in software and/or hardware. The processing module 214 creates a directory services creator unit, e.g. creator unit 228, containing instructions 110 on how to create and/or modify a directory services instance, after processing the configuration file. Based on the configuration file, the processing logic identifies an existing directory services instance, or settings to create a new directory services instance. The configuration file also specifies one or more test cases to apply to the existing directory services instance or a newly created instance. In one embodiment, the configuration file also specifies at least one configuration option out of various available options. In one embodiment, the options include upgrading, replicating, migrating, and/or virtualizing the directory services. In one embodiment, these options cause the processing module 214 to invoke upgrade process generator module 216, replication process generator module 218, migration process generator module 220, and/or virtualization process generator module 222, respectively.

If the configuration file specifies that a directory services or LDAP server is to be upgraded, then in one embodiment the processing module 214 invokes the upgrade process generator module 216. This module generates the instructions 110 needed to upgrade an LDAP database from a previous version to a new one automatically.

If the configuration file specifies that a directory services or LDAP server is to be replicated, then in one embodiment the processing module 214 invokes the replication process generator module 218. This module generates the instructions 110 needed to automatically replicate an LDAP instance into a copy of the same LDAP instance.

If the configuration file specifies that a directory services or LDAP server is to be migrated, then in one embodiment the processing module 214 invokes the migration process generator module 220. This module generates the instructions 110 needed to automatically migrate an LDAP instance to a new storage location (e.g. a target storage system) specified by the configuration parameters 212 in the configuration file.

If the configuration file specifies that a directory services or LDAP server is to be virtualized, then in one embodiment the processing module 214 invokes the virtualization process generator module 222. This module generates the instructions 110 needed to automatically convert a directory services instance running on a physical processing device to a directory services instance running on a virtual machine. Furthermore, if the configuration file specifies that the LDAP instance should be migrated to the cloud, this virtualization process generator module 222 additionally generates instructions for migrating the directory services instance in to a cloud system.

In one embodiment, the processing module 214 is able to generate creator units with instructions that support directory services from multiple vendors. In such an embodiment, the processing module 214 also communicates with a directory services compatibility module 224. When the processing module 214 generates vendor-neutral instructions for directory services, it accesses the compatibility module 224 to convert these vendor-neutral instructions to vendor-compatible instructions.

In one embodiment, the processing module 214 is able to generate creator units with instructions that support operating systems from multiple vendors. In such an embodiment, the processing module 214 also communicates with an operating system compatibility module 226. When the processing module 214 generates vendor-neutral operating system instructions, it accesses the compatibility module 224 to convert these vendor-neutral operating system instructions to vendor-compatible operating system instructions.

In some embodiments, the configuration file (204-208) does not contain all the options needed to configure the creator unit. In such an embodiment, the generator module 202 uses the user interface module 242 to request from the user the additional information needed. The user interface module 242 may be a command line interface and/or a graphical user interface, or some other means of communicating with the user. In some embodiments, this command line interface is Microsoft® Powershell™.

In some embodiments, the generator module 202 also generates instructions to place into the creator units which provide automated test cases (e.g., 230) for the created directory services instances. These instructions can also configure the created directory services in various test configurations so that the test cases can be run against the directory services in a particular testing environment.

As described above, generator module 202 creates one more directory service creator units (e.g. 228 and 236). These creator units contain instructions for creating a directory services instance. In one embodiment, these creator units are a script. In another embodiment, these creator units are a compiled executable or utility.

Each creator unit contains one or more test cases, e.g. test cases 230 or 238, and optionally a process, such as upgrade process 232 or migration process 240, which acts upon an existing directory services instance and creates a new or modified directory services instance from the existing instance. As described previously, in one embodiment, the instructions contained in these various processes are generated by the modules 216-222, and the process which a creator unit contains is selected from at least one of an upgrade process, a replication process, a migration process, or a virtualization process.

The test cases, e.g. test case 230, contains instructions to execute automated test cases and may configure the directory services instance to be in a particular test configuration. The test cases may also be modularized for automation multi-purposes. For example, one test case may execute a backup test against the directory services instance. As another example, a test case may insert many records into the directory services database and query the database for these records at a high rate. In one embodiment, when the test cases are coupled with one of the processes described above (e.g. the upgrade process 232 coupled with test cases 230), the test cases are able to test the effect of the process upon the database. For example, the test cases may test how a backup performs against an upgraded or virtualized directory services instance.

When the instructions within the directory services creator unit, e.g. unit 228, are executed, they access the directory services application interface module 244 to interface with the directory services instance. For example, an instruction can request the directory services be set up to flush logs from cache to disk at a certain interval. This instruction likely requires calling a function built into the directory services application interface. Thus the instruction utilizes the application interface module for the directory services to execute this instruction against the directory services instance. As each vendor's operating system and directory services are likely to be different, in one embodiment, the system is able, through the compatibility module 224 and 226, to create instructions which are specific to each vendor's application interface, i.e. to each vendor's operating system and directory services product.

Figure 3:
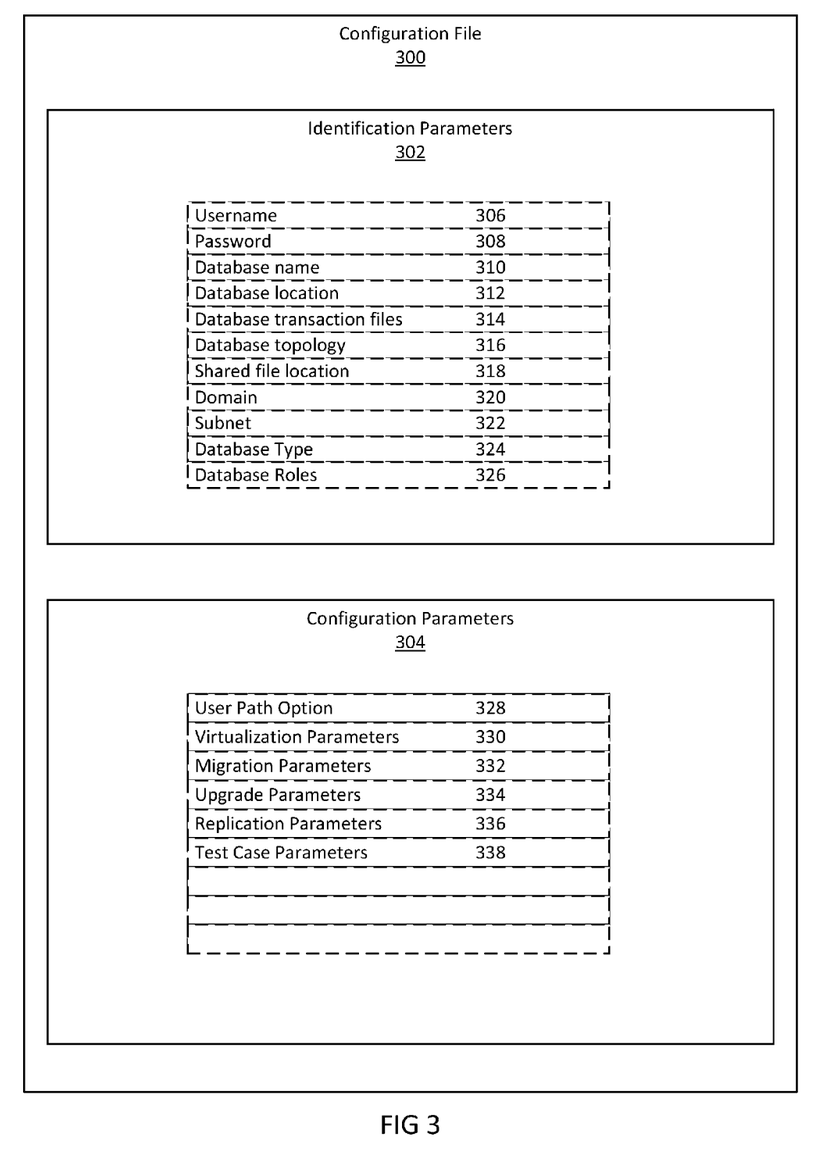
FIG. 3 is a chart illustrating an example of parameters for the configuration file for automated directory services creation according to one embodiment of the invention.

FIG. 3 is a chart illustrating an example of parameters for the configuration file for automated directory services creation according to one embodiment of the invention. While the configuration file is divided into identification parameters and configuration parameters, in some embodiments these parameters are not separated and are combined together.

Furthermore, while FIG. 3 lists many parameters, these parameters are not all required for automated directory services creation. Some, or all, of these parameters can be optional. Additionally, while the parameters may be provided in the configuration file 300, they may alternatively be provided by the user to the generator module 202 after the configuration file has been sent to the generator module. In such a case, some or all of the parameters listed in FIG. 3 can be provided through the user interface module 242 from the user.

The configuration file 300 generally includes identification parameters 302 identifying an existing database, or identifying the parameters for a new database, and configuration parameters 304 specifying how to modify that database, for example, to apply test cases to that database, or to upgrade, virtualize, replicate, or migrate the database, amongst other available options. These parameters may be provided in the configuration file as human readable strings, or as any form of computer-readable data. They may be identified directly in the file, or the file may provide a reference to the location of the information.

The identification parameters 302 may include a username 306, password 308, database name 310, database location 312 (e.g. database file location), and database transaction files 314. The identification parameters may also include information identifying the database topology 316 (e.g. an Active Directory™ forest, tree, or child), shared file location (e.g. the location of Active Directory™ shared files), domain 320, subnet 322, database type 324, and database roles 326.

The configuration parameters may include a user path option 328 (e.g. a selection for virtualization, migration, upgrade, and/or replication), virtualization parameters 330 if the virtualization option is selected, migration parameters 332 if the migration option is selected, upgrade parameters 334 if the upgrade option is selected, and replication parameters 336 if the replication option is selected. The configuration parameters also include test case parameters 338, which specify the test cases to apply to the existing or newly created directory services instance and any test environment configuration settings required.

Figure 4:
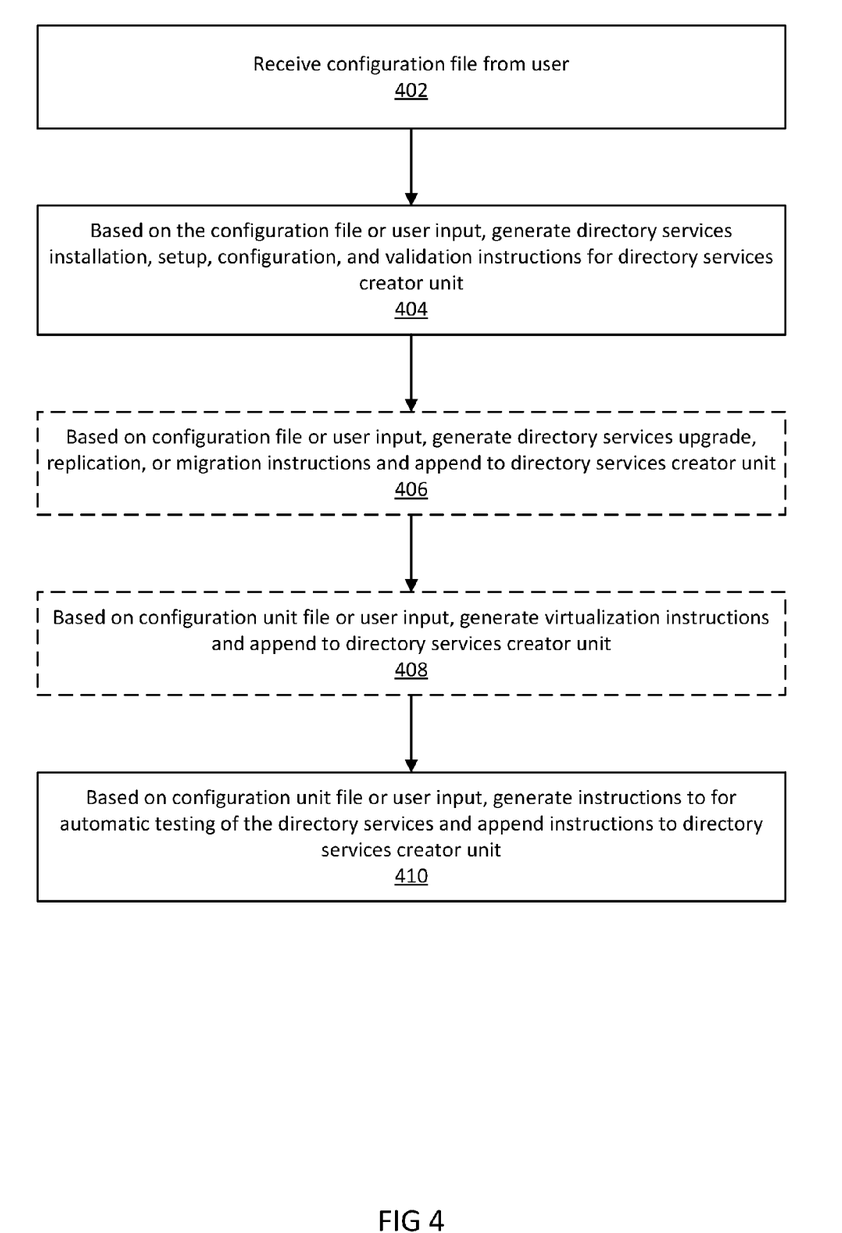
FIG. 4 is a flow diagram illustrating the creator unit generation process for automated directory services creation according to one embodiment of the invention.

FIG. 4 is a flow diagram illustrating the creator unit generation process for automated directory services creation according to one embodiment of the invention. At 402, the system receives a configuration file from the user. In some embodiments, the configuration file is received by the generator module 202 and the configuration file is 204. At 404, instructions to create a new directory services instance or modify an existing directory services instance are generated by the system, based on information in the configuration file or received from user input. In one embodiment, these instructions are generated by the generator module 202 and include instructions to install, set up, configure, and validate a directory services instance.

At 406, based on the configuration file or user input, instructions to upgrade, replicate, and/or migrate a directory services instance are generated by the system and added to the creator unit. If the user does not wish to perform these operations and indicates this in the configuration file or the user input, then no instructions are added. In some embodiments, these instructions are generated by the generator module 202.

At 408, based on the configuration file or user input, instructions to virtualize a directory services instance are generated by the system and added to the creator unit. If the user does not wish to perform these operations and indicates this in the configuration file or the user input, then no instructions are added. In some embodiments, these instructions are generated by the generator module 202.

At 410, based on the configuration file or user input, instructions for automatic testing of the directory services instance are generated by the system and added to the creator unit. In some embodiments, these instructions are generated by the generator module 202.

In some embodiments, the instructions which are described above are compatible with more than one operating system and more than one directory services provider. This is accomplished through the use of wrappers/compatibility modules, such as the compatibility modules 224 and 226. These wrappers allow the generator module 202 to generate an intermediate instruction type which is converted to the operating system and directory services specific instruction format when the instructions are processed by the wrappers.

Figure 5:
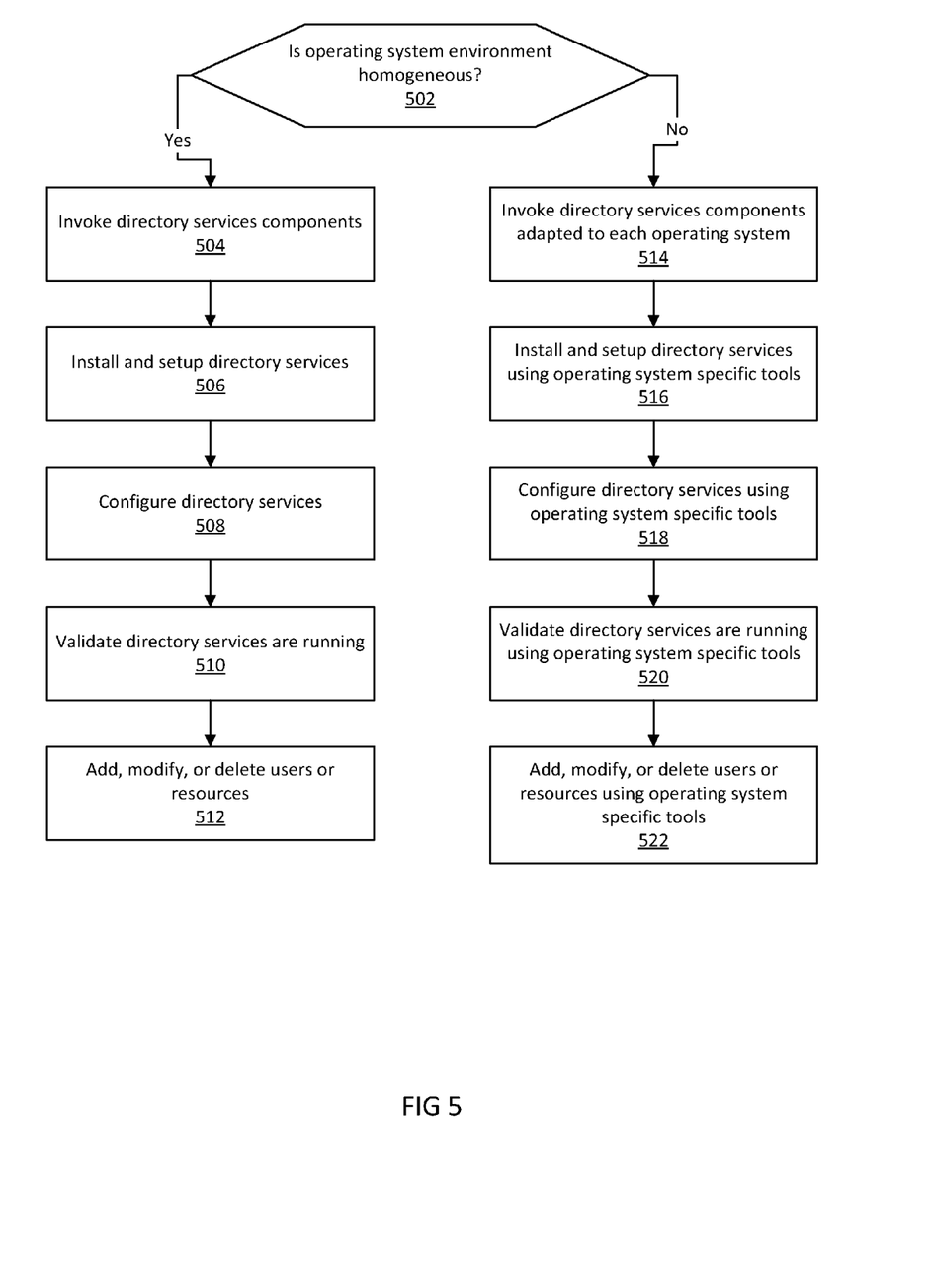
FIG. 5 is a flow diagram illustrating the generated instructions for directory services instance creation according to one embodiment of the invention.

FIG. 5 is a flow diagram illustrating the generated instructions for directory services instance creation according to one embodiment of the invention. In one embodiment, the conditionals of the flow diagram (outlined by hexagons) are processed by the generator module 202, while the other operations (outlined by rectangles) represent instructions to be placed in the creation units, e.g. creation unit 228, to be executed separately. Thus, the generator module determines by the conditionals whether a set of instructions (i.e. operations) are required to achieve the result specified by the configuration file, and these instructions are placed in the creator unit. In another embodiment, both the conditionals and operations are directly executed by the generator module 202. For illustration purposes, the flow diagram will be described via the latter embodiment, however the flow could easily implemented with the former embodiment.

At 502, if the operating system environment is homogenous, flow proceeds to 504. Otherwise, flow proceeds to 514. For example, the operating system environment is homogeneous if it comprises all Microsoft® Windows™ systems. As another example, the operating system environment is not homogeneous if it comprises various Windows systems, Linux distributions, Apple® OS X™ installations, various Unix flavors (e.g. HP-UX™) mainframe operating systems (e.g. IBM® z/OS™), and/or other operating systems. A heterogeneous operating system environment may also comprise a variety of directory services products, such as Microsoft® Active Directory™, IBM Tivoli, Apple® Open Directory™, etc. In one embodiment, this support for heterogeneous environments is enabled through a system of wrappers/compatibility modules, such as directory services compatibility module 224 and operating system compatibility module 226.

At 504, the system invokes the various directory services components which are needed to initialize the directory services. For example, the system may need to invoke various support libraries before installing the directory services. At 506, the directory services instance is installed and set up using the directory service components invoked in 504 and using application interface modules such as application interface module 244.

At 508, the directory services is configured using predetermined parameters, parameters received from the configuration file, e.g. configuration file 300, and/or parameters received from user input at 242. At 510, the directory services are validated to be running and operational. In one embodiment, this is performed by checking the active processes running on the system to see if the directory services processes are running properly. In another embodiment, this is performed by verifying the integrity of the directory services files which are created. At 512, additional maintenance operations are performed on the created directory services instance, such as adding, modifying, and/or deleting users and/or resources in the directory services instance.

If the operating system environment is heterogeneous, flow continues at 514 instead. At 514, the system invokes the various directory services components which are needed to initialize the directory services, according to the operating system and directory services environment which the operation is running on. For example, the system may need to invoke various support libraries for Windows™ and Active Directory™ in one instance and Open Directory™ and OS X™ in another instance. At 516, the directory services instance is installed and set up using the directory service components invoked in 514 and using application interface modules such as application interface module 244.

At 518, the directory services is configured using predetermined parameters, parameters received from the configuration file, e.g. configuration file 300, and/or parameters received from user input at 242. At 520, the directory services are validated to be running and operational. In one embodiment, this is performed by checking the active processes running on the system to determine if the directory services processes are running properly. In another embodiment, this is performed by verifying the integrity of the directory services files which are created. At 522, additional maintenance operations are performed on the created directory services instance, such as adding, modifying, and/or deleting users and/or resources in the directory services instance.

Figure 6:
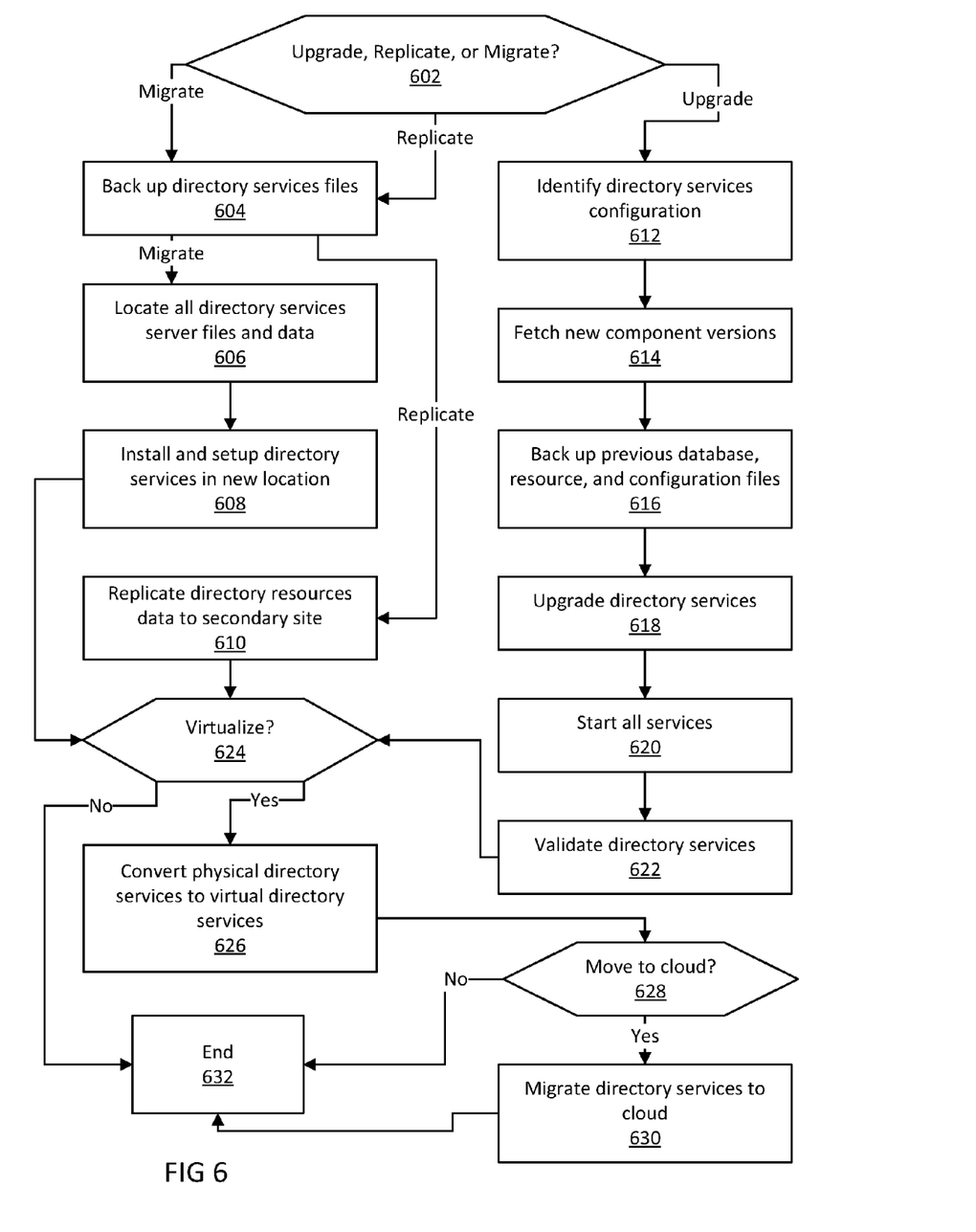
FIG. 6 is a detailed flow diagram illustrating the generated instructions for directory services instance creation according to one embodiment of the invention.

FIG. 6 is a detailed flow diagram illustrating the generated instructions for directory services instance creation according to one embodiment of the invention. In one embodiment, the conditionals of the flow diagram (outlined by hexagons) are processed by the generator module 202, while the other operations (outlined by rectangles) represent instructions to be placed in the creation units, e.g. creation unit 228, to be executed separately. Thus, the generator module determines by the conditionals whether a set of instructions (i.e. operations) are required to achieve the result specified by the configuration file, and these instructions are placed in the creator unit. In another embodiment, both the conditionals and operations are directly executed by the generator module 202. For illustration purposes, the flow diagram will be described via the latter embodiment, however the flow could also be implemented with the former embodiment.

At 602, the generator module 202 determines whether the upgrade, replicate, or migrate option is selected. In one embodiment, this option is provided by the configuration file. In another embodiment, this option is requested from the user by the generator unit in the user interface module 242. If the migrate or replication option is selected, flow proceeds to 604, and splits to 606 or 610, respectively. If the upgrade option is selected, flow proceeds to 602.

If the migrate or replicate option is selected, at 604, the directory services instance is backed up. This may include database files, metadata files, resource files, and configuration files related to the database.

If the migrate option is selected, flow proceeds to 606. At 606, all directory services files and data are located based on identification information (e.g. 302) in the configuration file (e.g. 300). At 608, based on the configuration parameters (e.g. 304) in the configuration file, the directory services instance is installed in a new location.

If the replicate option is selected, flow proceeds to 610, where the existing directory services instance is identified from the configuration file (e.g. 300) and is replicated based on configuration parameters within the configuration file.

If the upgrade option is selected, flow proceeds to 612. At 612, the system identifies the current directory services configuration based on identifying information within the configuration file (e.g. 300). In one embodiment, this includes identification of the current version, upgrade compatibility, system permissions, deprecated configuration parameters, currently connected users, available disk space, etc. These and other parameters may be required during the upgrade process to determine whether the upgrade is feasible and/or whether these parameters need to be changed during the upgrade process.

At 614, the new component versions are fetched based on information provided in the configuration file (e.g. 300) or through user input in user interface module 242. In another embodiment, the user does not need to specify the location of the new version in the configuration file or through user input, and instead the system automatically determines the newest compatible version for the current directory services instance. For example, the system may detect the versions and vendors of the operating system and directory services instance present on the hardware and automatically retrieve the updated versions from the proper storage site or database (e.g. the directory services vendor's website).

At 616, the current directory services instance is backed up. This may include database files, metadata files, resource files, and configuration files related to the database. At 618, the directory services instance is upgraded to the new version. At 620, the upgraded directory services instance is started. At 622, the directory services instance is validated. In one embodiment, validation is performed by determining whether the processes for the directory services instance are properly running on the system.

Once the system performs one or more of the requested user options (i.e. upgrade, replicate, and/or migrate), the system checks to see if the user has requested that the directory services instance be virtualized at 624. If the user has requested virtualization, flow proceeds to 626. Otherwise, flow ends at 632. At 626, the system converts the physical directory services to a virtual directory services. In one embodiment, this conversion involves moving the directory services instance which is running directly on hardware in to a virtual machine. At 628, the system further determines whether the user has requested that the directory services instance should be moved to the cloud. If this request has been made, flow proceeds to 630. Otherwise, flow ends at 632. At 630, the directory services instance is migrated to the cloud. In one embodiment, this migration involves moving the virtual machine instance containing the directory services instance on to an "infrastructure as a service" (IaaS) cloud hosting provider. In another embodiment, this migration involves moving the directory services instance to a "platform as a service" (PaaS) cloud hosting provider. In yet another embodiment, this migration involves moving the directory services data only to a "software as a service" (SaaS) cloud hosting provider. Flow then ends at 632.

Figure 7:
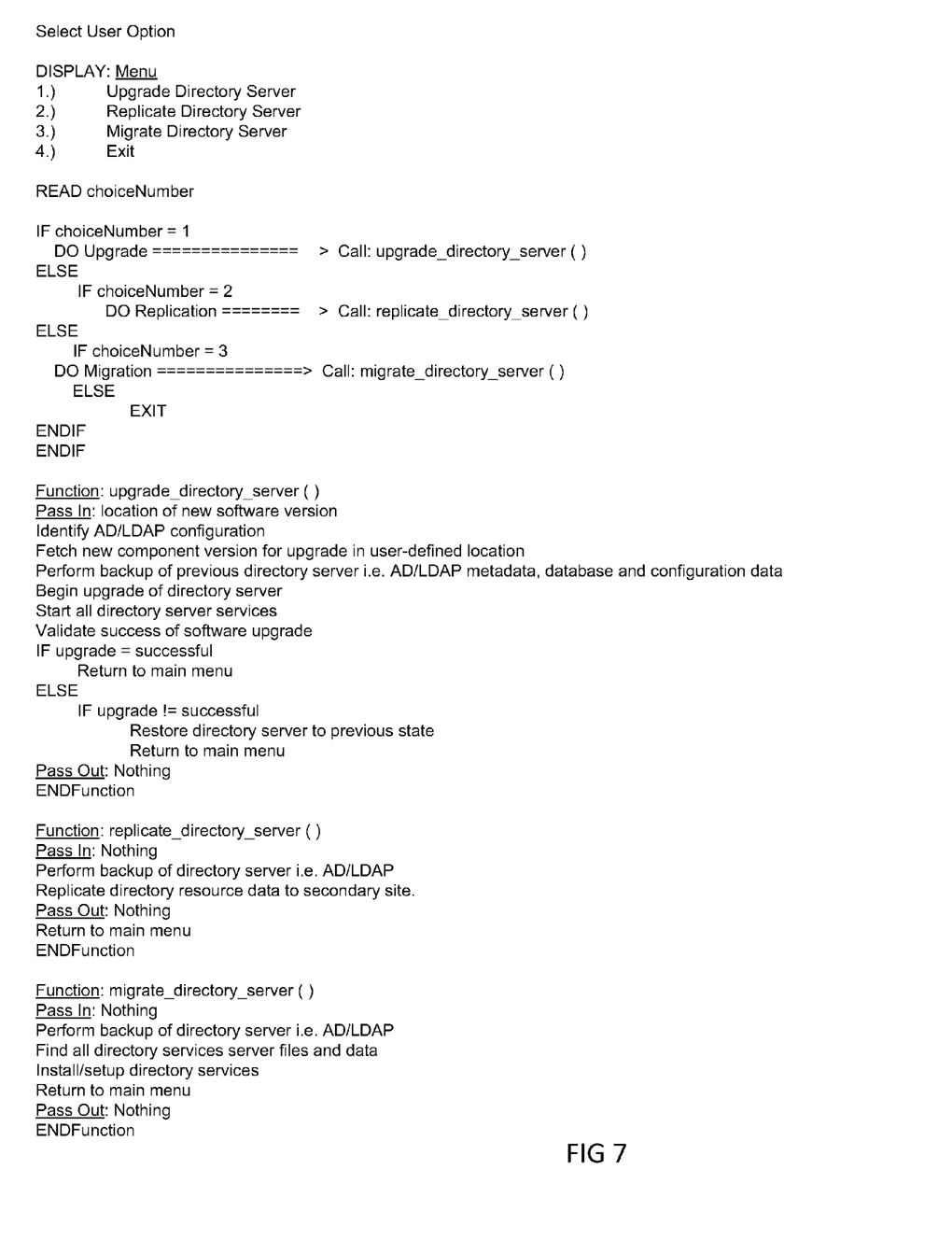
FIG. 7 is an example of high level processing logic to automate directory services creation according to one embodiment of the invention.

FIG. 7 is an example of high level processing logic for automated directory services creation according to one embodiment of the invention. In the example, a user is prompted for whether to upgrade, replicate, or migrate the directory services instance at "DISPLAY". Based on the user selection, flow proceeds to one of three functions to upgrade, replicate, or migrate the directory services instance. The flow of each function is defined in "Function: upgrade_directory_server( )", "Function: replicate_directory_server( )", and "Function: migrate_directory_server( )", respectively. The flow of these functions in this example of high level processing logic is similar to the flow chart in FIG. 6. Note that while the high level processing logic in FIG. 7 depicts a particular set of operations, the functionality described herein is not limited to being performed solely via these operations.

Figure 8:
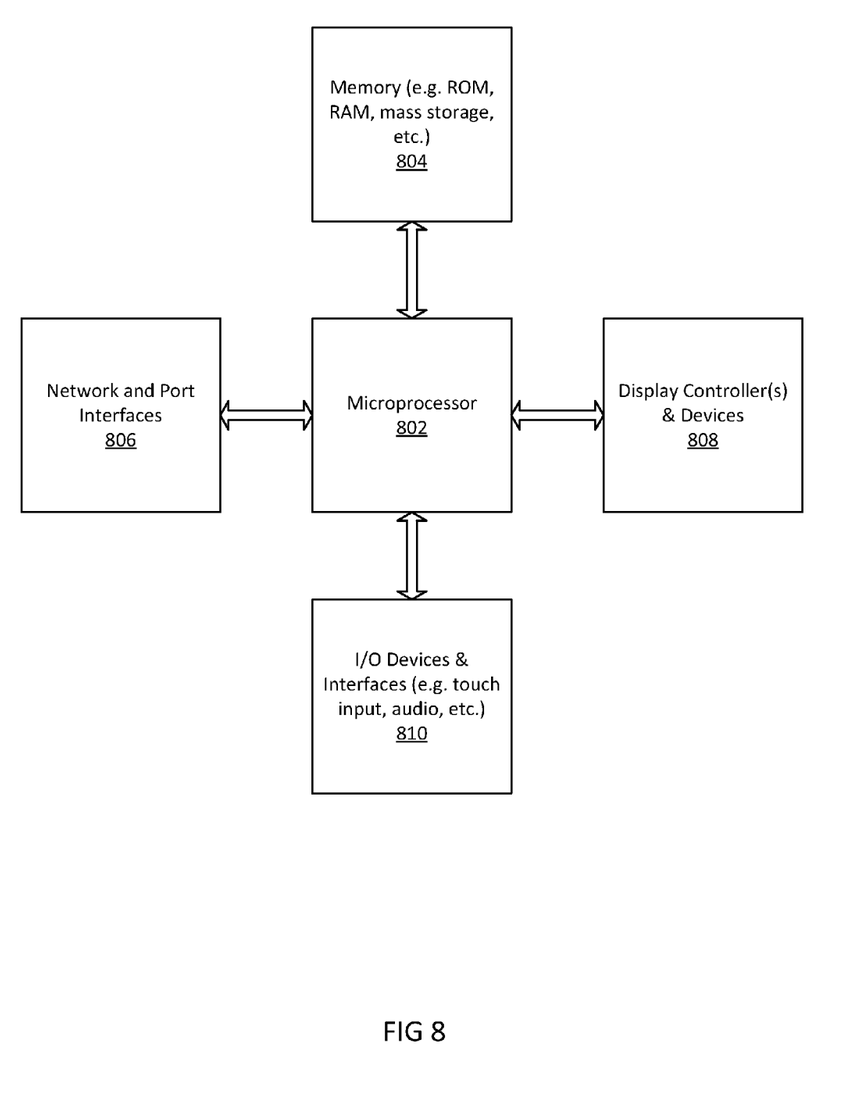
FIG. 8 illustrates, in block diagram form, an example of a processing system according to one embodiment of the invention.

FIG. 8 illustrates, in block diagram form, an example of a processing system 800 such as testing platform 118, generator module 102, created directory service instance 116, and database server hardware 200, etc. Data processing system 800 includes one or more microprocessors 805 and connected system components (e.g., multiple connected chips). Alternatively, data processing system 800 is a system on a chip.

Data processing system 800 includes memory 810, which is coupled to microprocessor(s) 805. Memory 810 may be used for storing data, metadata, and programs for execution by the microprocessor(s) 805. For example, memory 810 may include one or more of the data stores 810 and/or may store modules described herein. Memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 810 may be internal or distributed memory.

Data processing system 800 includes network and port interfaces 815, such as a port, connector for a dock, or a connector for a USB interface, FireWire, Thunderbolt, Ethernet, Fibre Channel, etc. to connect the system 800 with another device, external component, or a network. Exemplary network and port interfaces 815 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 800 with another device, external component, or a network and receive stored instructions, data, tokens, etc.

Data processing system 800 also includes display controller and display device 820 and one or more input or output ("I/O") devices and interfaces 825. Display controller and display device 820 provides a visual user interface for the user. I/O devices 825 allow a user to provide input to, receive output from, and otherwise transfer data to and from the system. I/O devices 825 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 8.

Data processing system 800 is an exemplary representation of one or more of the devices described above. Data processing system 800 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 800 may be a network computer, server, or an embedded processing device within another device or consumer electronic product. As used herein, the terms computer, device, system, processing system, processing device, and "apparatus comprising a processing device" may be used interchangeably with data processing system 800 and include the above-listed exemplary embodiments.

Additional components, not shown, may also be part of data processing system 800, and, in certain embodiments, fewer components than that shown in FIG. 8 may also be used in data processing system 800. It will be apparent from this description that aspects of the inventions may be embodied, at least in part, in software. That is, the computer-implemented method(s) may be carried out in a computer system or other data processing system 800 in response to its processor or processing system 805 executing sequences of instructions contained in a memory, such as memory 810 or other non-transitory machine-readable storage medium. The software may further be transmitted or received over a network (not shown) via network interface device 815. In various embodiments, hardwired circuitry may be used in combination with the software instructions to implement the present embodiments. Thus, the techniques are not limited to any specific combination of hardware circuitry and software, or to any particular source for the instructions executed by data processing system 800.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for creating directory services for testing a software application that accesses directory services, the method comprising:
receiving a configuration file specifying at least one of a plurality of identification parameters and a plurality of configuration parameters for configuring directory services, wherein the plurality of identification parameters comprises a username, a password, a database name, a database location, and at least one of a database transaction file, a database topology, a shared files location, a domain, a subnet, a database type, and database roles, wherein the plurality of configuration parameters comprises at least one of a user path option, virtualization parameters, migration parameters, replication parameters, and upgrade parameters, and wherein the user path option comprises at least one of an upgrade option, a replication option, a migration option, and a virtualization option; and
automatically generating a plurality of directory service processing instructions based upon the plurality of identification and configuration parameters in the configuration file; and
executing by a processor the plurality of directory service processing instructions to perform operations to set up directory services without requiring a user to manually provide parameters to set up the directory services, the operations including:
detecting an operating system environment,
invoking a plurality of directory service components adapted to the operating system environment,
installing and setting up a directory service instance,
configuring the directory service instance, and
validating that the directory service instance is running; and
executing a software application within the operating system environment to access a storage system using the directory services, including evaluating operations performed by the software application.

2. The method of claim 1, wherein when the upgrade option is selected, the operations further comprise:
identifying a current directory service configuration;
fetching and upgrading a current directory service to a new directory service version;
preserving a current directory service instance, resources, and configuration data;
starting all directory services related processes; and
validating the upgraded directory instance.

3. The method of claim 1, wherein when the replication option is selected, the operations further comprise:
replicating the plurality of directory service resources to a secondary site; and
validating the replicated directory service instance.

4. The method of claim 1, wherein when the migration option is selected, the operations further comprise:
finding all directory service server files and data;
installing and setting up a new directory service instance at a new location; and
validating the new directory service instance.

5. The method of claim 1, wherein when the virtualization option is selected, the operations further comprise:
converting an existing directory service instance from a physical instance to a virtual instance, wherein the virtual instance is stored in one of a local location and a cloud location; and
validating the virtual directory service instance.

6. The method of claim 1, wherein automatically generating a plurality of directory service processing instructions further comprises generating instructions to support a plurality of operating systems and directory service configurations by adding a plurality of wrappers, wherein the plurality of wrappers are customized for each combination of operating system and directory service configuration.

7. A non-transitory computer-readable medium having computer instructions stored therein for testing a software application that accesses directory services, which when executed by a processor, cause the processor to perform operations comprising:

receiving a configuration file specifying at least one of a plurality of identification parameters and a plurality of configuration parameters for configuring directory services, wherein the plurality of identification parameters comprises a username, a password, a database name, a database location, and at least one of a database transaction file, a database topology, a shared files location, a domain, a subnet, a database type, and database roles, wherein the plurality of configuration parameters comprises at least one of a user path option, virtualization parameters, migration parameters, replication parameters, and upgrade parameters, and wherein the user path option comprises at least one of an upgrade option, a replication option, a migration option, and a virtualization option; and automatically generating a plurality of directory service processing instructions based upon the plurality of identification and configuration parameters in the configuration file; and executing the plurality of directory service processing instructions to perform operations to set up directory services without requiring a user to manually provide parameters to set up the directory services, the operations including:
detecting an operating system environment,
invoking a plurality of directory service components adapted to the operating system environment,
installing and setting up a directory service instance,
configuring the directory service instance, and
validating that the directory service instance is running; and executing a software application within the operating system environment to access a storage system using the directory services, including evaluating operations performed by the software application.

8. The non-transitory computer-readable medium of claim 7, wherein when the upgrade option is selected, the operations further comprise:
identifying a current directory service configuration;
fetching and upgrading a current directory service to a new directory service version;
preserving a current directory service instance, resources, and configuration data;
starting all directory services related processes; and
validating the upgraded directory instance.

9. The non-transitory computer-readable medium of claim 7, wherein when the replication option is selected, the operations further comprise:
replicating the plurality of directory service resources to a secondary site; and
validating the replicated directory service instance.

10. The non-transitory computer-readable medium of claim 7, wherein when the migration option is selected, the operations further comprise:
finding all directory service server files and data;
installing and setting up a new directory service instance at a new location; and
validating the new directory service instance.

11. The non-transitory computer-readable medium of claim 7, wherein when the virtualization option is selected, the operations further comprise:

converting an existing directory service instance from a physical instance to a virtual instance, wherein the virtual instance is stored in one of a local location and a cloud location; and
validating the virtual directory service instance.

12. The non-transitory computer-readable medium of claim 7, wherein automatically generating a plurality of directory service processing instructions further comprises generating instructions to support a plurality of operating systems and directory service configurations by adding a plurality of wrappers, wherein the plurality of wrappers are customized for each combination of operating system and directory service configuration.

13. A data processing system for testing a software application that accesses directory services, comprising:
a processor; and
a memory coupled to the processor for storing instructions which when executed from the memory, cause the processor to:
receive a configuration file specifying at least one of a plurality of identification parameters and a plurality of configuration parameters to configure a directory services, wherein the plurality of identification parameters comprises a username, a password, a database name, a database location, and at least one of a database transaction file, a database topology, a shared files location, a domain, a subnet, a database type, and database roles, wherein the plurality of configuration parameters comprises at least one of a user path option, virtualization parameters, migration parameters, replication parameters, and upgrade parameters, and wherein the user path option comprises at least one of an upgrade option, a replication option, a migration option, and a virtualization option; and
automatically generate a plurality of directory service processing instructions based upon the plurality of identification and configuration parameters in the configuration file; and
execute the plurality of directory service processing instructions to perform operations to set up the directory services without requiring a user to manually provide parameters to set up the directory services, the operations functioning to:
detect an operating system environment,
invoke a plurality of directory service components adapted to the operating system environment,
install and set up a directory service instance,
configure the directory service instance, and
validate that the directory service instance is running; and
execute a software application within the operating system environment to access a storage system using the directory services, including to evaluate operations performed by the software application.

14. The data processing system of claim 13, wherein when the upgrade option is selected, the operations further functioning to:
identify a current directory service configuration;
fetch and upgrade a current directory service to a new directory service version;
preserve a current directory service instance, resources, and configuration data;
start all directory services related processes; and
validate the upgraded directory instance.

15. The data processing system of claim 13, wherein when the replication option is selected, the operations further functioning to:
- replicate the plurality of directory service resources to a secondary site; and
- validate the replicated directory service instance.

16. The data processing system of claim 13, wherein when the migration option is selected, the operations further functioning to:
- find all directory service server files and data;
- install and set up a new directory service instance at a new location; and
- validate the new directory service instance.

17. The data processing system of claim 13, wherein when the virtualization option is selected, the operations further functioning to:
- convert an existing directory service instance from a physical instance to a virtual instance, wherein the virtual instance is stored in one of a local location and a cloud location; and
- validate the virtual directory service instance.

18. The data processing system of claim 13, wherein the automatic generation of a plurality of directory service processing instructions further comprises operations to generate instructions to support a plurality of operating systems and directory service configurations by the addition of a plurality of wrappers, wherein the plurality of wrappers are customized for each combination of operating system and directory service configuration.

* * * * *